United States Patent Office 2,965,588
Patented Dec. 20, 1960

1

2,965,588

MIXTURE OF AN OIL MODIFIED ALKYD COMPOSITION, A POLYACRYLAMIDE, AND A RESINOUS REACTION PRODUCT OF AN ALKYLENE OXIDE ADDUCT WITH A POLYHYDRIC ALCOHOL

Frank R. Spencer, Stamford, Conn., assignor to American Cyanamid Company, New York, N.Y., a corporation of Maine No Drawing. Filed Apr. 11, 1958, Ser. No. 727,791

10 Claims. (Cl. 260—22)

This invention relates to a novel composition of matter comprising a mixture of (1) a glyceride oil-modified alkyd resin emulsified with (2) a resinous reaction product of an aliphatic polycarboxylic acid, an oil fatty acid, certain adducts of alkylene oxides and certain polyhydric alcohols and (3) small quantities of a polyacrylamide. More particularly, this invention relates to an oil-in-water emulsion of a glyceride oil-modified alkyd resin and the reaction product of an aliphatic polycarboxylic acid, an oil fatty acid, and the adduct of an alkylene oxide having from 2 to 4 carbon atoms with a polyhydric alcohol having at least 5 carbon atoms and 4 hydroxy groups dispersed in water under alkaline conditions and containing small quantities of a polyacrylamide and to the process of preparing the same.

One of the objects of the present invention is to produce an oil-in-water emulsion of a glyceride oil-modified alkyd resin with the reaction product of an aliphatic polycarboxylic acid, an oil fatty acid and the adduct of an alkylene oxide having between 2 and 4 carbon atoms with a polyhydric alcohol having at least 5 carbon atoms and 4 hydroxy groups dispersed in water under alkaline conditions and containing small quantities of a polyacrylamide. A further object of the present invention is to produce a coating composition dispersed in an aqueous medium which displays good scrub resistance, less brush drag, and good pigment suspension. These and other objects of the present invention will be discussed in greater detail hereinbelow.

GLYCERIDE OIL-MODIFIED ALKYD RESINS

The first component used in the practice of the present invention is a glyceride oil-modified alkyd resin. These alkyd resins are well known in the art and are prepared by reacting a polycarboxylic acid with a polyhydric alcohol in the presence of a glyceride oil or their fatty acids or their monoglycerides.

The polycarboxylic acids which are used to prepare these alkyd resins are generally preferably those which are free from non-benzenoid unsaturation. Representative of these acids are phthalic, oxalic, malonic, succinic, glutaric, sebacic, adipic, pimelic, suberic, azelaic, citric, tartaric, malic, tricarballylic and the like.

Whenever available, the anhydrides of these acids may readily be used. Quite obviously, combinations of these acids and/or their anhydrides may be used. In these conventional alkyd resins, the polycarboxylic acids free from non-benzenoid unsaturation present will amount to at least about 90% by weight based on the total weight of polycarboxylic acid used. Minor amounts of alpha, beta unsaturated polycarboxylic acids may be used in the preparation of these alkyd resins. The amount of these alpha, beta ethylenically unsaturated acids, which may be used should not exceed about 10% by weight based on the total weight of polycarboxylic acid used. Amongst these alpha, beta ethylenically unsaturated polycarboxylic acids which may be used are maleic, fumaric, aconitic, itaconic, and the like. Quite obviously, these acids may be used in combination with one another and whenever available, the anhydrides of these acids may be used either singly, or in combination with one another, or in combination with the acids of the same category.

The preferred polycarboxylic acid to be used is phthalic anhydride. Amongst the polyhydric alcohols which may be used in the preparation of the alkyd resins used in the present invention are glycerol, ethylene glycol, diethylene glycol, pinacol, arabitol, xylitol, mannitol, trimethylol propane, trimethylol ethane, sorbitol, pentaerythritol, dipentaerythritol, propylene glycol, dipropylene glycol, the alkane diols and the like. Obviously, these polyhydric alcohols may be used in combination with one another. If mixtures of these polyhydric alcohols are to be used, it is generally desired that the mixture of alcohols have an average functionality of at least about 3. For most practical purposes, glycerol is the preferred polyhydric alcohol. The amount of polyhydric alcohol which is used in the preparation of these alkyd resins will generally be in an amount sufficient on a purely stoichiometrical basis to provide an excess of about 25% over and beyond that amount required to provide complete esterification of the acid components present.

The oils used to modify the alkyd resins used in the composition of the present invention are the glyceride oils either vegetable or animal. These oils may be either non-drying, semi-drying or drying oils. They may be used in amounts varying over a broad range such as the amounts used to produce short oil alkyd resins, medium oil alkyd resins or long oil alkyd resins. Among the oils which may be used advantageously are coconut oil, palm kernel oil, palm oil, babasu, rape, mustard seed oil, olive oil, sesame oil, corn oil, cottonseed oil, soya oil, sunflower, walnut oil, linseed oil, perilla oil, castor, either raw or dehydrated oil, tung oil, oiticica, whale oil, menhaden oil, sardine oil, herring and the like. In addition to using the oils recited hereinabove, one may use the fatty acids derived therefrom or tall oil fatty acids. Still further, one may make use of the monoglycerides of these fatty acids. Quite obviously, these oils and/or their fatty acids and/or their monoglycerides may be used in combination with one another.

In preparing the oil-modified alkyd resin of the present invention, one would generally carry out the esterification reaction of the polycarboxylic acid and the polyhydric alcohol in the presence of the oil material at conventional temperatures in the order of about 200–260° C. for a period of time sufficient to give an acid number between about 100 and about 5. One skilled in the art will exercise the known precautions to avoid gelation of the alkyd resin by overheating or prolonged heating at elevated temperatures.

THE ADDUCT

The adduct used to prepare the reaction product which is the second component used in the composition of the present invention is prepared by reacting an alkylene oxide with a polyhydric alcohol having at least five carbon atoms and at least four alcoholic hydroxy groups.

Amongst the alkylene oxides which may be used are ethylene oxide, propylene oxide and butylene oxide. These oxides may be used either singly or in combination with one another.

A special group of polyhydric alcohols are used to form the adduct with the alkylene oxides. These alcohols must have at least five carbon atoms such as pentaerythritol and at least four hydroxy groups. Representative members of this category of polyhydric alcohols in addition to pentaerythritol and dipentaerythritol, sorbitol, mannitol, alpha, methyl Δ glucoside and the like. These polyhydric alcohols may be used either singly or in combination with one another. The preferred polyhydric alcohol is sorbitol. The preferred alkylene oxide is ethylene oxide.

These adducts may be prepared by reacting the alkylene oxides with the polyhydric alcohol over a comparatively wide range of molecular weights. For instance, one may use between about 3 mols of the alkylene oxide per hydroxy group in the alcohol to about 7 mols of the alkylene oxide per hydroxy group of the polyhydric alcohol. Preferably, one would use about 5 mols of alkylene oxide per hydroxy group in the polyhydric alcohol especially when the alkylene oxide is ethylene oxide and the polyhydric alcohol is sorbitol.

The adduct thus prepared is then reacted with an aliphatic carboxylic acid and glyceride oil fatty acid and preferably an unsaturated fatty acid such as those mentioned hereinabove. Of the polycarboxylic acids, which may be used, one can readily utilize either the saturated or the unsaturated polycarboxylic acids. The alpha, beta ethylenically unsaturated polycarboxylic acids which may be used are maleic, fumaric, aconitic, itaconic, and the like. Whenever available, the anhydrides of these acids may be used. Still further, these acids and/or their anhydrides may be used singly or in combination with one another. Amongst the saturated aliphatic polycarboxylic acids which may be used are malonic, succinic, glutaric, sebacic, adipic, pimelic, suberic, azelaic, citric, tartaric, malic, tricarballylic and the like. These polycarboxylic acids and/or their anhydrides, whenever available, may be used in combination with one another or in combination with the alpha, beta ethylenically unsaturated polycarboxylic acids and/or their anhydrides.

Among the fatty acids which are reacted with the adduct together with the aliphatic polycarboxylic acids are the fatty acids derived from animal and vegetable oils. Although these fatty acids may be saturated, for best results, it is preferred that the unsaturated fatty acids be used, particularly those which have 18 carbon atoms in the chain. Illustrative of these preferred fatty acids are oleic, linoleic, linolenic, elaeostearic, licanic, ricinoleic and the like. One could use fatty acids having a lesser number of carbon atoms in the chain such as myristoleic, palmitoleic and the like, or even erucic and the like. These fatty acids may be used either singly or in combination with one another. Although the component 2 of the composition of the present invention may be comprised of the reaction product of the aliphatic polycarboxylic acid, an oil fatty acid, and the adduct of an alkylene oxide and a polyhydric alcohol alone, it is preferred that there be added to the system to become an integral part of the reaction product of component 2, a significant amount of a rosin acid. When the adduct, which is a complex polyhydric alcohol is reacted with the mixture of acids, a sufficient amount of adduct should be utilized to insure that upon substantially complete esterification based on relatively low acid number and on stoichiometrical calculations that there will be an excess of about 20-25% hydroxyl compound to get such a result. When the esterification reaction is completed, the acid number may vary between about 5 and 100, but preferably about 15-20.

In the preparation of the composition of the present invention, the conventional oil-modified alkyd resin is first prepared and when the esterification is substantially completed, the component 2, freshly prepared, and in a warm condition is poured gradually with constant stirring into the warm alkyd resin. When the blending has been completed, the mixture of 1 and 2 is poured into water and dispersed by constant agitation such as stirring. The aqueous dispersion is then rendered alkaline by use of a suitable alkalizing agent such as ammonium hydroxide. As an alternative approach, the water may be rendered alkaline prior to the addition of the blend of resins so that the resinous materials are rendered alkaline simultaneously upon emulsification to form the oil-in-water emulsion. Any pH on the alkaline side can be utilized for the final composition although it is preferred that the pH of the final composition be between 8 and 9. The amount of resin mixture introduced into the water can vary very substantially depending on the solids content for the coating composition desired such as 5% up to about 60% solids based on the total weight of the emulsion. Ordinarily, for most purposes, a solids content of about 40% to about 50% resin solids based on the total emulsion is preferred. The ultimate composition as produced may be used as coating compositions and may be applied by spraying, brushing, roller coating, knife or spatula application or the like. As prepared, the compositions of the present invention have a milky white appearance but are exceedingly stable and do not tend to separate out into two or more phases on standing even for prolonged periods of time. Notwithstanding the milky white appearance of the emulsion, when applied to a given surface and permitted to air dry, these coatings produce clear films which are substantially completely free of such defects as pin-holing, cratering, orange peel and the like.

It can be seen from the above that if a clear, coating composition is desired, the resinous emulsion may be used, if preferred. On the other hand, if one would like a colored coating composition, one could make use of conventional pigments and dyes, to produce colored coating compositions, ranging from black to white, including the pastels. If acidic pigments are used, additional alkalizing material should be used such as ammonium hydroxide in order to complete the pH of the ultimate emulsion on the alkaline side and preferably between 8 and 9.

The resin solids content of these emulsions can be varied significantly as indicated briefly hereinabove. For most purposes, the emulsion should contain at least about 50% of water. This concentration of solids is generally very satisfactory for brushing or roller coating. For spraying purposes, however, it may often be desirable to have a lesser resin solids such as 30-49%. If, upon dilution, one finds that the viscosity has dropped too low, one may thicken the emulsion by adding additional resin solids of the same class or one may add other thickeners such as carboxy methyl cellulose, methyl cellulose, magnesium aluminum silicate and the like.

THE POLYACRYLAMIDES

In the practice of the process of the present invention, one incorporates into the mixture of oil-modified alkyd resin and the resinous reaction product of an aliphatic polycarboxylic acid, an oil fatty acid and the adduct described in detail hereinabove comparatively small amounts of a polyacrylamide. The amounts of the polyacrylamide used may be varied between about 0.1% and 5% by weight, based on the total solids weight of said mixture or emulsion of the polyacrylamide. Preferably, one would use between about 0.25% and 0.5% by weight of the polyacrylamide. The molecular weight of the polyacrylamide is not critical. Polyacrylamides having a molecular weight between about 500 (number average) and 20,000,000 (weight average) may be used. Higher molecular weight polymers may be utilized if desired. Preferably, the molecular weight of the polyacrylamide used will vary between about one million and two million on a weight average basis. The number average method for determining molecular weight is the osmotic pressure technique. This osmotic pressure technique is generally applicable to polymers having comparatively low molecular weight. For polymers having higher molecular weight, the weight average molecular weight technique is generally used. This weight average molecular weight can be determined by the light scattering method (confer P. J. Flory, Principles of Polymer Chemistry, Cornell University Press, 1953, pages 266-316, inclusive). The polyacrylamide used as a starting material in the practice of the process of the present invention will be any of the conventional polymers prepared by polymerizing an acrylamide by any one of the many known processes.

In addition to using acrylamide per se as the monomer, one may use additionally methacrylamide, ethacrylamide, and linear methylol derivatives thereof. Inasmuch as there is a substantial plurality of prior art references which make a clear teaching of the methods that may be used to produce polymeric acrylamides of the classes described herein, it is deemed unnecessary to engage in a prolonged discussion of the methods for the preparation of such polymers and the characteristics thereof.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

ALKYD RESIN A

Into a suitable reaction vessel equipped with thermometer, stirrer and reflux condenser, there is introduced 148 parts of phthalic anhydride, 200 parts of distilled tall oil, 25 parts of ethylene glycol, 15.5 parts of Dow Polyol 565 (an aromatic glycol), 1,1'-isopropylidenebis (p-phenyleneoxy) di-2-propanol and 82 parts of pentaerythritol. The charge is heated gradually to about 245° C. and held at that temperature until the acid number is 18. The charge is cooled to 200° C. and is poured solid.

EMULSIFIER 1

Into a suitable reaction vessel equipped with thermometer, stirrer and reflux condenser, inert gas inlet and outlet tubes, there is introduced 300 parts of the adduct of 1 mol of sorbitol and 30 mols of ethylene oxide, 24 parts of fumaric acid, 157 parts of linseed oil fatty acids, and 24 parts of gum rosin. The mixture is heated gradually with constant stirring to a temperature about 230–235° C. under an atmosphere of nitrogen gas until an acid number of 22 is reached. The resin thus produced is cooled to 100° C. and is cut to a 50% solids solution with water.

ALKYD EMULSION 1

30 parts of the Alkyd Resin A is blended with 24 parts of emulsifier 1 solution (50% solids in water) and the mixture is heated with constant stirring. When the mixture is thoroughly melted and fluid, there is added 1 part of a 10% aqueous solution of ammonium hydroxide and 30 parts of water with constant stirring until a smooth "oil-in-water" emulsion is formed.

ALKYD EMULSION 2

Into a suitable mixing vessel, there is introduced 72 parts of the resin emulsion prepared according to Alkyd Emulsion 1 (cut to 50% solids with water), 90 parts of a 1% aqueous dispersion of morpholine, 118 parts of a titanium dioxide pigment, 29 parts of calcium carbonate, 0.4 part of a 24% aqueous solution of lead octoate and 0.33 part of 6% cobalt as cobalt naphthenate. The formulation is charged to a pebble-mill and milled overnight.

RESIN EMULSIFIER 2

Into a suitable reaction vessel equipped as in Emulsifier 1, there is introduced 510 parts of an adduct of 1 mol of sorbitol and 20 mols of ethylene oxide, 380 parts of linseed oil fatty acids, 162 parts of gum rosin, 58 parts of fumaric acid. The charge is heated gradually to about 235° C. while continuously bubbling nitrogen gas therethrough. The charge is held for an acid number of 25.1, cooled and poured solid.

ALKYD RESIN B

Into a suitable reaction vessel equipped as in Alkyd Resin A, there is introduced 400 parts of phthalic anhydride 505 parts of distilled tall oil, 89 parts of tall oil fatty acids 76 parts of ethylene glycol, and 222 parts of pentaerythritol. The charge is heated up to 245° C. and held at that temperature for about 1 hour. The charge is then cooled gradually to about 225° C. and maintained at that temperature for about 2 hours. The charge is then cooled to about 200° C. and then held at that temperature for about 1 hour. The charge is finally cooled to 150° C.

ALKYD EMULSION 3

While holding the sample thus prepared at that temperature, there is added to 195 parts thereof 65 parts of the Emulsifier 2 and the components are thoroughly mixed in a suitable mixing vessel. After cooling to 120° C., 260 parts of a 3% aqueous solution of morpholine at 65° C. is added with further agitation. The agitation is continued for about 12 minutes. Thereupon, 130 parts of water containing 2% ammonia (28%) was added and the emulsion is cooled to 30° C.

EMULSIFIER 3

Into a suitable reaction vessel equipped as in Emulsifier 1, there is introduced 600 parts of the reaction product of 1 mol of sorbitol, and 30 mols of ethylene oxide, 314 parts of linseed oil fatty acids, 134 parts of rosin and 48 parts of fumaric acid. The charged materials are heated gradually to about 230° C. and maintained at that temperature with nitrogen gas bubbling therethrough until an acid number of 20.0 is obtained. The reaction product thus produced is cooled to 150° C. and poured out into a suitable container.

ALKYD EMULSION 4

To 868 parts of the Alkyd Resin B, there is added 217 parts of Emulsifier 3 and the 2 components are mixed thoroughly at 125° C. for 1 hour. The mixture thus prepared is poured slowly into 1200 parts of water and 24 parts of morpholine held at 90° C. The solids is about 48% and the emulsion produced is a white milky liquid. When poured on clear glass, this emulsion dried to a smooth continuous glossy film. Furthermore, this emulsion endured 12 freeze-thaw cycles (24 hours at −15° F. and 20–24 hours at 73° F.) without separation, coagulation or breaking. The mechanical stability of the emulsion is exceptional. A jar half filled with pebbles and emulsion was rolled for 10 days with no detrimental effects to the emulsion. This emulsion was diluted 1:50 with water and no separation occurred in 14 days.

EMULSIFIER 4

Into a suitable reaction vessel equipped as in Emulsifier 1, there is introduced 191 parts of the reaction product of 1 mol of dipentaerythritol and 30 mols of ethylene oxide, 32.5 parts of gum rosin, 76 parts of linseed oil fatty acids, 11.6 parts of fumaric acid. The charge is then mixed thoroughly together and reacted at a temperature of about 230° C. for about 2 hours, cooled to 100° C. and poured into a suitable container. The acid number was 25.2.

ALKYD EMULSION 5

Into a suitable reaction vessel equipped as in Alkyd Emulsion 1, there is introduced 195 parts of Alkyd Resin B. There is then added 65 parts of Emulsifier 4 and the components blended by mixing for about 1 hour at 120° C. There is then added with constant agitation 320 parts of a 3% aqueous solution of morpholine heated at 65° C. and held at that temperature for 15 minutes. The emulsion is then cooled to 25° C. and reduced to 40% solids with 2% aqueous solution of ammonia.

EMULSIFIER 5

Into a suitable reaction vessel equipped as in Emulsifier 1, there is introduced 59 parts of succinic acid, 380 parts of linseed oil fatty acids 162 parts of gum rosin and 725 parts of the adduct of 1 mol of sorbitol and 30 mols of ethylene oxide. The charge is mixed together and then reacted at a temperature of about 245° C. to an acid number of 16.8. The charge is cooled and poured.

ALKYD EMULSION 6

Into a suitable reaction vessel equipped as in Alkyd Emulsion 1, there is introduced 400 parts of Alkyd Resin B. Thereto, there is added 100 parts of Emulsifier 5 and the components are thoroughly mixed for about 1 hour at 120° C. 300 parts of a 2% aqueous solution of morpholine heated to 65° C. are aded with agitation and the mixture is heated to 90° C. whereupon 200 additional parts of the aqueous solution of morpholine is added and again the emulsion is heated to 90° C. The charge is then cooled to 30° C. and reduced to 48% solids with additional water.

EMULSIFIER 6

Into a suitable reaction vessel equipped as in Emulsifier 1, there is introduced 27 parts of succinic acid, 242 parts of linseed oil fatty acids and 325 parts of the adduct of 1 mol of sorbitol and 30 mols of ethylene oxide. The charge is mixed and then heat reacted at 230° C. until an acid number of 11.0 is reached. The charge is cooled and poured into a suitable container.

ALKYD EMULSION 7

To 500 parts of Alkyd Resin B, there is added 125 parts of Emulsifier 6 and the two components are thoroughly mixed at 125° C. There is then added 300 parts of a 3% aqueous solution of morpholine at 45° C. and held at 85–90° C. for 30 minutes. An additional 325 parts of a 3% aqueous morpholine solution at 50° C. is added and the emulsion heated to 91° C. The composition was then permitted to cool to room temperature.

ALKYD RESIN C

Into a suitable reaction vessel equipped as in Alkyd Resin A, there is introduced 148 parts of phthalic anhydride, 250 parts of distilled tall oil, 85 parts of tall oil fatty acids, and 133 parts of pentaerythritol. The charge is then heat reacted at about 230–240° C. until an acid number of 16 is reached. When a sample is cut to a 50% solids content with mineral spirits, a viscosity of 1300 cps. is reached. The resin is cooled to 150° C. for blending with Emulsifier 3.

ALKYD EMULSION 8

To 1085 parts of the Alkyd Resin C, there is added 190 parts of Emulsifier 3 and the two components are thoroughly mixed at about 150° C. and then cooled to 118° C. 500 parts of this mixture are introduced into a suitable reaction vessel and there is added thereto 150 parts of a 2% aqueous solution of morpholine and the mixture is agitated for about 4 minutes whereupon 200 additional parts of a 2% aqueous solution of morpholine in 50 part portions are introduced at 3 minute intervals. When the addition is completed, the emulsion changed from water-in-resin to resin-in-water. Throughout this operation, the temperature is maintained at about 85° C. The emulsion thus produced is diluted to 50% solids by the addition of 150 parts of a 2% aqueous solution of morpholine. The diluted emulsion is cooled to 70° C. and poured into a suitable container. The emulsion thus produced had good mechanical stability and dilution stability in keeping with the previously described tests.

ALKYD EMULSION 9

A flat enamel is prepared from the emulsion of Alkyd Emulsion 8 in the following manner: 120 parts of the emulsion of Alkyd Emulsion 8, 108 parts of titanium dioxide, 60 parts of lithopone, 48 parts of a micronized calcium carbonate, 24 parts of diatomaceous silica, 140 parts of a 2% aqueous solution of morpholine, 0.87 part of a 24% solution of lead naphthenate, 0.52 part of a 6% solution of cobalt calculated as cobalt naphthenate, 0.32 part of an anti-oxidant and 2.4 parts of pine oil are introduced into a suitable pebble mill container and are milled on a pebble mill for about 17 hours. The paint, thus produced, is readily discharged from the mill. It had a consistency of 52 Krebs units and a pH of 9.0. It was taken up to 72 Krebs units by the addition of 6% by weight of a 5% aqueous solution of carboxy methyl cellulose.

ALKYD RESIN D

Into a suitable reaction vessel equipped as in Alkyd Resin A, there is introduced 148 parts of phthalic anhydride, 150 parts of castor oil (raw) and 95 parts of glycerine. The charge is heated together for 1 hour at about 280° C. and is then heated at 240° C. until an acid number of about 10 is reached.

ALKYD EMULSION 10

To 400 parts of the Alkyd Resin D, there is added 100 parts of Emulsifier 3, and the two components are thoroughly mixed at 130° C. and then cooled to 118° C. Thereupon, 100 parts of a 2% aqueous solution of ammonia is added with constant agitation followed by the gradual addition of 511 additional parts of a 2% aqueous solution of ammonia, while maintaining the temperature at about 80° C. The pH is adjusted to 9.0 with 6 parts of a 28% aqueous solution of ammonia. The emulsion thus produced was an oil-in-water type and had a viscosity of 61 Krebs units.

ALKYD EMULSION 11

A flat enamel is prepared from the emulsion of Alkyd Emulsion 10 by incorporating into 325 parts of said emulsion (at 44% solids), 220 parts of titanium dioxide, 181 parts of a 3% aqueous solution of ammonia and 3.5 parts of pine oil. These components were introduced into a pebble mill and milled for about 24 hours. To 150 parts of the paste paint thus produced, there is added 48 parts of the emulsion of Alkyd Emulsion 10, which then resulted in a thin, sprayable enamel.

EMULSIFIER 7

Into a suitable reaction vessel equipped as in Emulsifier 1, there is introduced 58 parts of fumaric acid, 380 parts of linseed oil fatty acids, 162 parts of gum rosin and 757 parts of the adduct of 1 mol of sorbitol and 30 mols of ethylene oxide. The charge is heated at about 240° C. for about 4 hours to an acid number of 22.4. The charge is cooled and poured into a suitable container.

ALKYD EMULSION 12

To 400 parts of Alkyd Resin B, there is added 45 parts of Emulsifier 7, and the two components are heated with constant agitation to 120° C. Thereupon, 450 parts of a 2% aqueous solution of ammonia is added in four approximately equal portions while maintaining the temperature at 85–89° C. The product produced was an oil-in-water emulsion of approximately 50% solids which was cooled and ready for use in a paint formulation.

*Example 1*

Into a suitable blending vessel, there is introduced 615 parts of pigment grade rutile titanium dioxide, 3645 parts of pigment grade natural wollastonite, 1054 parts of pigment grade diatomaceous silica, 3381 parts of Alkyd Emulsion 4 (50% solids), 13.6 parts of cobalt as a solution of cobalt naphthenate, 52 parts of redistilled white pine oil, 1576 parts of a 0.56% aqueous solution of ammonia and 1948 parts of water. The charged components are blended and ground together in a pebble mill for 24 hours. A solution of polyacrylamide having a molecular weight of 2,000,000 (weight average) is prepared by stirring 6.3 parts of said polyacrylamide with 93.7 parts of water at room temperature until dissolved. This 6.3% solution of polyacrylamide is blended with the pebble mill grind prepared hereinabove using 614 parts of the pebble mill grind and 106 parts of the polyacrylamide solution. When the polyacrylamide solution is completely dispersed in the pebble mill grind, and diluted to the desired viscosity, the product is then ready for use. The coating composition thus prepared is brushed on interior walls and allowed to dry for over one hour. In applying the coating composition to the wall, it is noted that the brush marks level themselves out and disappear, displaying favorable leveling properties. It is further noted that the coating composition displayed good pigment suspension and after drying, the ultimate film displayed very good scrub resistance.

*Example 2*

Into a suitable mixing vessel as in Example 1, there is introduced 128 parts of Alkyd Emulsion 5 (45% solids), 141 parts of a 0.56% aqueous solution of ammonia, 0.52 part of cobalt naphthenate solution containing 6% cobalt, 2.4 parts of pine oil, 123 parts of pigment grade rutile titanium dioxide, 24 parts of pigment grade diatomaceous silica, 81 parts of natural grade wollastonite, 9.8 parts of water and 48 parts of a 6.3% aqueous solution of polyacrylamide having a molecular weight of 2,000,000 (weight average). The charged materials are blended together in a pebble mill grinding for about 24 hours. The coating composition thus prepared was applied to masonry and to an exterior house siding and allowed to dry. The films produced on both the masonry and the exterior house siding displayed good properties with respect to covering power, ease of application, speed of drying, leveling of brush marks, and scrub resistance.

*Example 3*

Example 1 is repeated in substantially all details except that in the place of the Alkyd Emulsion 4, there is substituted an equivalent amount of Alkyd Emulsion 1 and in the place of the polyacrylamide having the molecular weight of 2,000,000, there is substituted an equivalent amount of polyacrylamide having a molecular weight of 1,000,000 (weight average). A very satisfactory coating composition suitable for interior and exterior use is obtained.

*Example 4*

Example 2 is repeated in all details except that in the place of Alkyd Emulsion 5, there is substituted an equivalent amount of Alkyd Emulsion 2 and in the place of the polyacrylamide having the molecular weight of 2,000,000, there is substituted a polyacrylamide having a molecular weight of 500,000 (weight average). A highly desirable coating composition results which may be applied to masonry or interior ceilings and walls with very satisfactory results.

*Example 5*

Example 1 is repeated in substantially all details except that in the place of the Alkyd Emulsion 4, there is substituted an equivalent amount of Alkyd Emulsion 3 and in the place of the polyacrylamide having a molecular weight of 2,000,000, there is substituted a substantially linear methylol polyacrylamide having a molecular weight of 1,500,000 (weight average). The coating composition thus prepared when applied to an interior wall displayed good covering films with flat film appearance.

*Example 6*

Example 2 is repeated in substantially all details except that in the place of the Alkyd Emulsion 5, there is substituted an equivalent amount of Alkyd Emulsion 6 and in the place of the polyacrylamide having a molecular weight of 2,000,000, there is substituted a polyacrylamide having a molecular weight of 2,500,000 (weight average).

Comparable coating compositions may be prepared using the Alkyd Emulsions 7, 8, 9, 10, 11 and 12 with small quantities of a plurality of available polymers of acrylamide, methyacrylamide and their substantially linear methylol derivatives.

It has been stated hereinabove that the polyacrylamides prepared for use in the practice of the present invention are well known in the art. Reference is made to the U.S. Patent No. 2,132,671 and its British counterpart 467,492, U.S. Patents Nos. 2,289,540 and 2,486,191. A substantial plurality of other references are readily available to those skilled in the art.

The compositions of the present invention may be applied as a coating composition either by brushing, spraying, roller coating, dipping, and the like. Quite obviously, other pigment and dye materials may be used in coloring the coating compositions of the present invention. If a substantially clear film is desired, no pigmentation or dye is used.

It will be noted in certain of the examples set forth hereinabove pertaining to the preparation of the emulsifier that rosin acids and/or gum rosin are used in the formulation. It is not imperative that the rosin material be utilized at all; however, it is preferred that some rosin material be incorporated into the emulsifier. The total amount of rosin acid which may be utilized in the composition of the present invention may vary between about 1% and 60% by weight based on the total resin solids of the composition. For optimum results the rosin acid content will fall within about 25% and 30% by weight based on the total resin solids of the composition.

I claim:

1. A composition of matter comprising a mixture of (1) an alkyd resin modified with a member selected from the group consisting of glyceride oils, glyceride oil fatty acids and their monoglycerides and (2) the resinous reaction product of (a) an aliphatic polycarboxylic acid, (b) an oil fatty acid and (c) the adduct of an alkylene oxide having from 2–4 carbon atoms with a polyhydric alcohol having at least 5 carbon atoms and at least 4 hydroxy groups wherein said adduct contains from about 3 mols to about 7 mols of said alkylene oxide per hydroxy group of said polyhydric alcohol and (3) 0.1% to 5% by weight, based on the total solids weight of said mixture, of a polyacrylamide.

2. A composition of matter comprising an oil-in-water emulsion of (1) an alkyd resin modified with a member selected from the group consisting of glyceride oils, glyceride oil fatty acids and their monoglycerides and (2) the resinous reaction product of (a) an aliphatic polycarboxylic acid, (b) an oil fatty acid and (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, dispersed in water under alkaline conditions and (3) 0.1% to 5% by weight, based on the total solids weight of said emulsion, of a polyacrylamide.

3. A composition of matter comprising an oil-in-water emulsion of (1) an alkyd resin modified with a member selected from the group consisting of glyceride oils, glyceride oil fatty acids and their monoglycerides, and (2) the resinous reaction product of (a) fumaric acid, (b) an oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol and (d) rosin acids, dispersed in water under alkaline conditions and (3) 0.1% to 5% by weight, based on the total solids weight of said emulsion, of a polyacrylamide.

4. A composition of matter comprising an oil-in-water emulsion of (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, and (d) rosin acids, dispersed in water under alkaline conditions and (3) 0.1% to 5% by weight, based on the total solids weight of said emulsion, of a polyacrylamide.

5. A composition of matter comprising an oil-in-water emulsion of (1) an alkyd resin modified with a member selected from the group consisting of glyceride oils, glyceride oil fatty acids and their monoglycerides and (2) the resinous reaction product of (a) an aliphatic polycarboxylic acid, (b) an unsaturated oil fatty acid, (c) the adduct of ethylene oxide with sorbitol wherein said adduct contains from about 3 mols to about 7 mols of ethylene oxide per hydroxy group in the sorbitol, dispersed in water under alkaline conditions and (3) 0.1% to 5% by weight, based on the total solids weight of said emulsion, of a polyacrylamide.

6. A composition of matter comprising an oil-in-water emulsion of (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide and sorbitol wherein said adduct contains from about 3 mols to about 7 mols of ethylene oxide per hydroxy group in the sorbitol, and (d) rosins acids, dispersed in water under alkaline conditions and (3) 0.1% to 5% by weight, based on the total solids weight of said emulsion, of a polyacrylamide.

7. A composition of matter comprising an oil-in-water emulsion of (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide and pentaerythritol wherein said adduct contains from about 3 mols to about 7 mols of ethylene oxide per hydroxy group in the pentaerythritol and (d) rosin acids, dispersed in water under alkaline conditions and (3) 0.1% to 5% by weight, based on the total solids weight of said emulsion, of a polyacrylamide.

8. A composition of matter comprising an oil-in-water emulsion of (1) an alkyd resin modified with a member selected from the group consisting of glyceride oils, glyceride oil fatty acids and their monoglycerides and (2) the resinous reaction product of (a) an aliphatic polycarboxylic acid, (b) an unsaturated oil fatty acid, (c) the adduct of ethylene oxide and dipentaerythritol wherein said adduct contains from about 3 mols to about 7 mols of ethylene oxide per hydroxy group in the dipentaerythritol and (d) rosin acids, dispersed in water under alkaline conditions and (3) 0.1% to 5% by weight, based on the total solids weight of said emulsion, of a polyacrylamide.

9. A composition of matter comprising an oil-in-water emulsion of (1) an alkyd resin modified with a member selected from the group consisting of glyceride oils, glyceride oil fatty acids and their monoglycerides, and (2) the resinous reaction product of (a) maleic acid, (b) an unsaturated oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, and (d) rosin acids, dispersed in water under alkaline conditions and (3) 0.1% to 5% by weight, based on the total solids weight of said mixture, of a polyacrylamide.

10. A composition of matter comprising an oil-in-water emulsion of (1) an alkyd resin modified with a member selected from the group consisting of glyceride oils, glyceride oil fatty acids and their monoglycerides, and (2) the resinous reaction product of (a) fumaric acid, (b) linseed oil fatty acids, (c) the adduct of ethylene oxide and sorbitol wherein said adduct contains from about 3 mols to about 7 mols of ethylene oxide per hydroxy group in the sorbitol, and (d) rosin acids, dispersed in water under alkaline conditions and (3) 0.1% to 5% by weight, based on the total solids weight of said emulsion, of a polyacrylamide.

References Cited in the file of this patent

UNITED STATES PATENTS

| | | |
|---|---|---|
| 2,360,394 | Burrell | Oct. 17, 1944 |
| 2,537,949 | Adams | Jan. 16, 1951 |
| 2,598,663 | Kropa | June 3, 1952 |
| 2,889,293 | Hensley et al. | June 2, 1959 |